United States Patent

Chen et al.

[11] Patent Number: 5,808,770
[45] Date of Patent: Sep. 15, 1998

[54] METHOD AND APPARATUS FOR USING ON-OFF-KEYING USING LASER RELAXATION OSCILLATION

[75] Inventors: Howard Zehua Chen, Berkeley Heights; Michael Gunnar Johnson, Hopatcong, both of N.J.

[73] Assignee: Lucent Technologies, Inc., Murray Hill, N.J.

[21] Appl. No.: 580,911

[22] Filed: Dec. 29, 1995

[51] Int. Cl.$^6$ .................................................... H04B 10/04
[52] U.S. Cl. ........................... 359/182; 359/184; 372/25; 372/28
[58] Field of Search .................................... 359/161, 180, 359/181, 182, 188, 184; 372/21, 22, 25, 26, 30, 28

[56] References Cited

U.S. PATENT DOCUMENTS

| | | | |
|---|---|---|---|
| 5,197,075 | 3/1993 | Arecchi et al. | 372/28 |
| 5,367,587 | 11/1994 | Mizuochi et al. | 385/27 |
| 5,475,699 | 12/1995 | Sakiyama et al. | 372/43 |
| 5,519,528 | 5/1996 | Kodera et al. | 359/161 |
| 5,548,603 | 8/1996 | Calvani et al. | 372/25 |
| 5,646,774 | 7/1997 | Takara et al. | 359/340 |
| 5,659,568 | 8/1997 | Wang et al. | 372/96 |

*Primary Examiner*—Rafael Bacares

[57] ABSTRACT

An optical communications system for transmission of optical signals using relaxation oscillation subcarrier, on-off keying modulation of the optical signals. Relaxation oscillation subcarrier on-off keying improves the signal-to-noise ratio of a receiver receiving the modulated optical signals and the data rate of the optical signal. A modulation device generates relaxation oscillations by pulsing a driving current for a transmitter between a first level below a threshold current and a second level above the threshold current. The optical communication system can further include a fiber optic link between the transmitter and the receiver. The optical communications system can further incorporate multiple frequency shift keying. The modulation device and modulation scheme can be used in all digital optical communications systems using a pulsed laser diode.

17 Claims, 4 Drawing Sheets

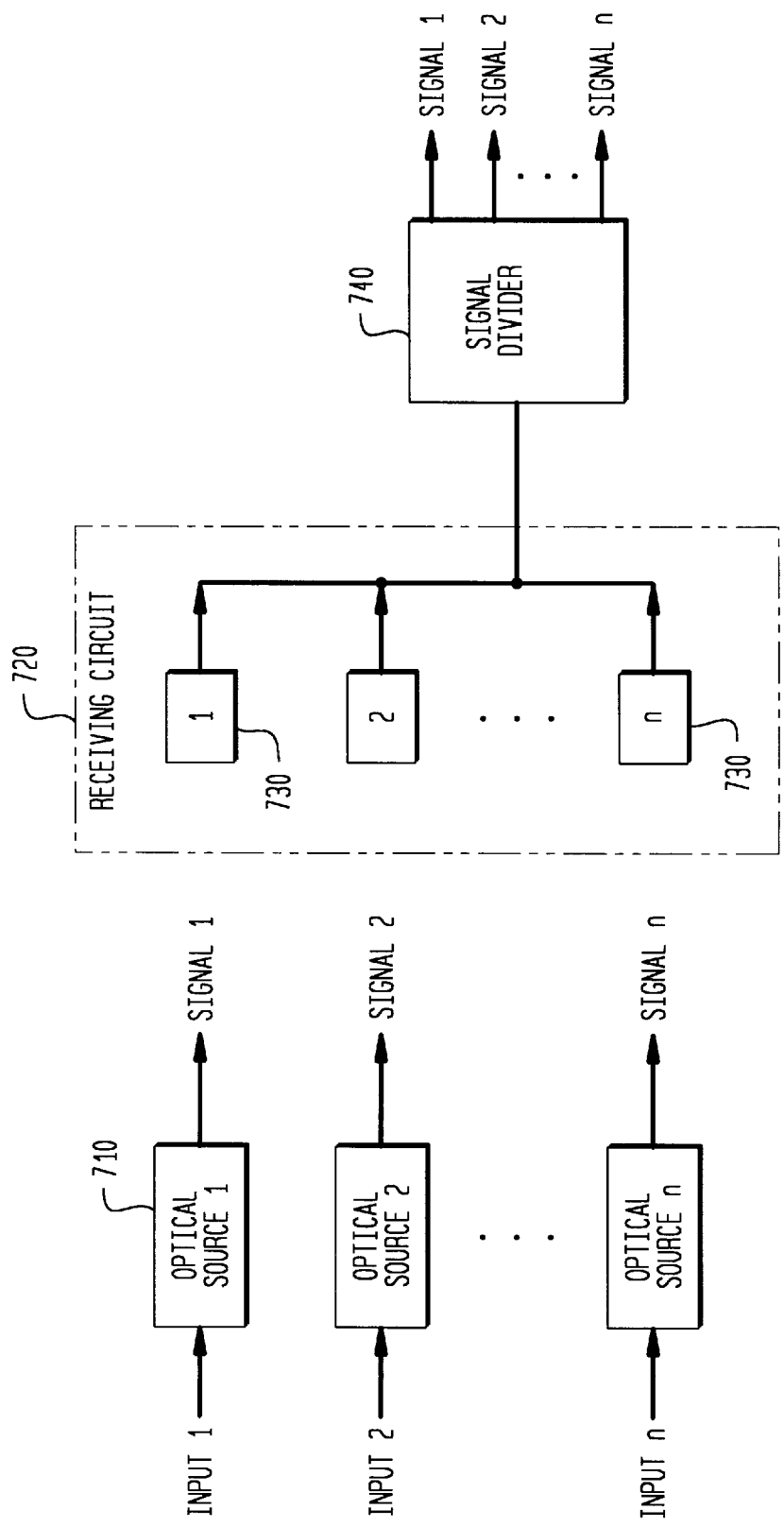

METHOD AND APPARATUS FOR USING ON-OFF-KEYING USING LASER RELAXATION OSCILLATION

BACKGROUND OF THE INVENTION

1. Field of the Invention

The present invention relates to a modulation system and method for optical communication. In particular, the present invention relates to the use of a phenomenon known as "relaxation oscillation" in semiconductor lasers as a subcarrier frequency modulator of the optical signal intensity.

2. Description of Related Art

It is well known that, in optical communication systems using semiconductor lasers, the electrical carrier density of a laser diode reaches a constant level (known as the "threshold carrier density") upon reaching a steady state condition, which is independent of the current density injected into the semiconductor laser diode. The steady state condition is known as "gain clamping". However, in a transient (dynamic) period before reaching the steady state condition, the electrical carrier density can exceed the steady state value if an instantaneous drive current is above a threshold current. The instantaneous drive current above the threshold current causes a "relaxation oscillation" in the electrical carrier density and in the resulting semiconductor laser light intensity of the optical signal.

Generally, a relaxation oscillation is considered bad for optical communications. Therefore, relaxation oscillation is avoided in conventional fiber-optic communication systems by biasing a semiconductor laser above the threshold current to eliminate the possibility of the electrical carrier density oscillation. See for example, A. Yariv, *Optical Electronics*, 3rd Ed., 713 pgs., 1985, the subject matter of which is hereby incorporated by reference. In particular, chapter 15.6 of *Optical Electronics* discusses preventing relaxation oscillation.

In infrared (IR) wireless optical communications, however, a semiconductor laser cannot be biased above the threshold current because its constant DC bias current represents a large current drain on the battery. The problem is especially acute for portable IR wireless communication systems. Therefore, in conventional IR wireless communications, the semiconductor laser is pulsed from zero current to a current level well above the threshold current to save electrical power. This reduced power requirement increases battery life.

Two conventional modulation schemes used in IR wireless optical communications are binary on-off keying and subcarrier on-off keying. In simple binary on-off keying, a "1" is represented by a pulse and a "0" is represented by the absence of a pulse. In subcarrier on-off keying, a "1" is represented by a burst of short pulses and a "0" is represented by an absence of a burst of short pulses. Conventional binary on-off keying and subcarrier on-off keying are shown in FIGS. 1A and 1B, respectively. Simple binary on-off keying is also referred to as subcarrier on-off keying using a frequency of 0, as shown in FIG. 1A. Thus, the terminology "subcarrier on-off keying" encompasses both FIGS. 1A and 1B.

Conventional binary on-off keying uses a threshold voltage detector and preferably a Nyquist filter in the receiver. Subcarrier on-off keying can achieve a higher signal-to-noise ratio than binary on-off keying when a narrow bandpass filter is used to detect the presence of a burst of subcarrier short pulses at the receiver. However, in subcarrier on-off keying, many pulses are required to transmit a single bit. Typically, in subcarrier on-off keying more than ten pulses constitute a burst of pulses. Therefore, the data rate for subcarrier on-off keying is limited.

SUMMARY OF THE INVENTION

It is an object of the present invention to use relaxation oscillations as a subcarrier modulation scheme for on-off keying in optical communications.

It is a further object to provide a modulation system that uses relaxation oscillations for on-off keying in an optical communication system.

It is yet another object to increase the data rate and efficiency for an optical communication system by using the relaxation oscillations as a subcarrier modulation scheme for on-off keying modulation.

At least the above objects are accomplished by providing an optical communications system for transmission of optical signals that includes a transmitter, a receiver including a narrow bandpass filter and a device to modulate optical signals. The modulation device modulates optical signals by generating a relaxation oscillation subcarrier, using on-off keying. The relaxation oscillation, subcarrier modulation scheme improves the optical signal efficiency of a laser because a narrow bandpass filter can be used in the receiver to improve a received signal-to-noise ratio. The relaxation oscillation, subcarrier modulation scheme improves the data rate of the optical signal because only one pulse is required to transmit a binary "1" or "0". The modulation device generates the relaxation oscillation subcarrier, using on-off keying by pulsing a driving current for a transmitter between a first level below a threshold current and a second level above the threshold current. The optical communication system can further include multiple narrow bandpass filters at the receiver to incorporate multiple frequency shift keying (MFSK). In addition, the optical communications system can include a fiber optic link between the transmitter and the receiver to carry the optical signals.

Other objects, advantages and salient features of the invention will become apparent from the detailed description taken in conjunction with the annexed drawings, which disclose illustrative embodiments of the invention.

BRIEF DESCRIPTION OF THE DRAWINGS

The invention will be described with reference to the following drawings in which like reference numerals refer to like elements and wherein:

FIG. 7 is a diagram depicting an optical communication system using MFSK according to still yet another embodiment of the present invention.

DETAILED DESCRIPTION OF PREFERRED EMBODIMENTS

Relaxation oscillation always accompanies a large amplitude, on-off modulated driving current in a semiconductor laser.

The oscillation in optical power of a semiconductor laser can be expressed as follows:

$$P \propto \text{Exp}[-\alpha t]\text{Sin}[\omega t] \qquad (1)$$

In Equation (1), P is the power, $\alpha$ and $\omega$ are two constants and t is the time. The constant $\alpha$ can be expressed as follows:

$$\alpha \approx I/(2\tau_n I_{th}) \qquad (2)$$

In Equation (2), $\tau_n$ is the carrier lifetime, I is the instantaneous current and $I_{th}$ is the threshold current. The constant $\omega$ can be expressed as follows:

$$\omega \approx \sqrt{1/\tau_n\tau_p(I/I_{th} - 1) - \alpha^2} \qquad (3)$$

In Equation (3), $\tau_p$ is the photon life. The relaxation oscillation frequency can be expressed as follows:

$$f = 2\pi\omega \qquad (4)$$

Figure 2:
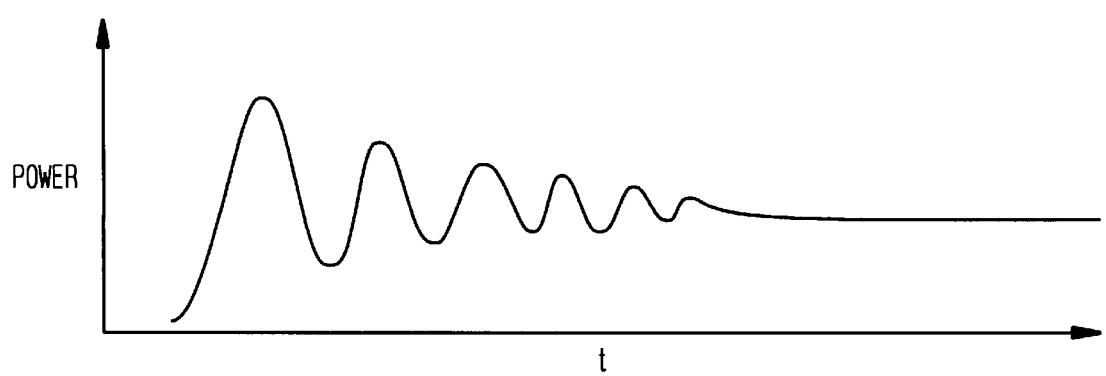
FIG. 2 is a diagram depicting relaxation oscillation in a semiconductor laser diode.

In Equation (4), $f$ is the relaxation oscillation frequency. A typical value for the relaxation oscillation frequency is on the order of 1 gigahertz (GHz). The typical behavior of relaxation oscillation is shown in FIG. 2 where the horizontal axis represents time and the vertical axis represents optical power.

Figure 3A:
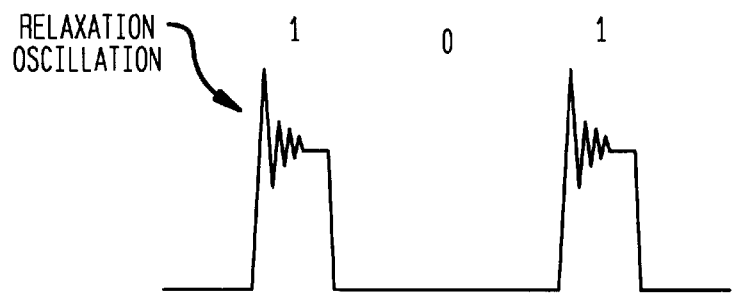
FIGS. 3 and 3B are diagrams depicting binary on-off keying with relaxation oscillation and subcarrier on-off keying with relaxation oscillation, respectively, according to an embodiment of the present invention.
Figure 3B:
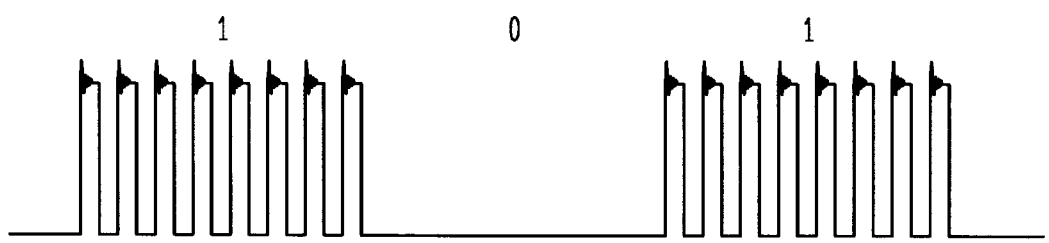

Thus, an optical communication system can use relaxation oscillations generated by a single large amplitude, on-off pulse as a subcarrier for the optical signal. The large pulse is generated by pulsing the driving current from a first level below the threshold current of the semiconductor laser to a second level above the threshold current. A first illustrative embodiment using relaxation oscillation subcarrier, on-off keying is shown in FIGS. 3A and B. An optical signal using binary on-off keying with relaxation oscillation produces larger signal-to-noise ratios in receivers than are realizable using conventional binary on-off keying (FIG. 1A) because of the use of a narrow bandpass filter in the receiver, as shown in FIG. 3A. An optical signal using binary on-off keying with relaxation oscillation has an increased data rate over the conventional subcarrier on-off keying (FIG. 1B) because only 1 pulse is required to indicate the "1" or the "0", as shown in FIG. 3B.

Figure 5:
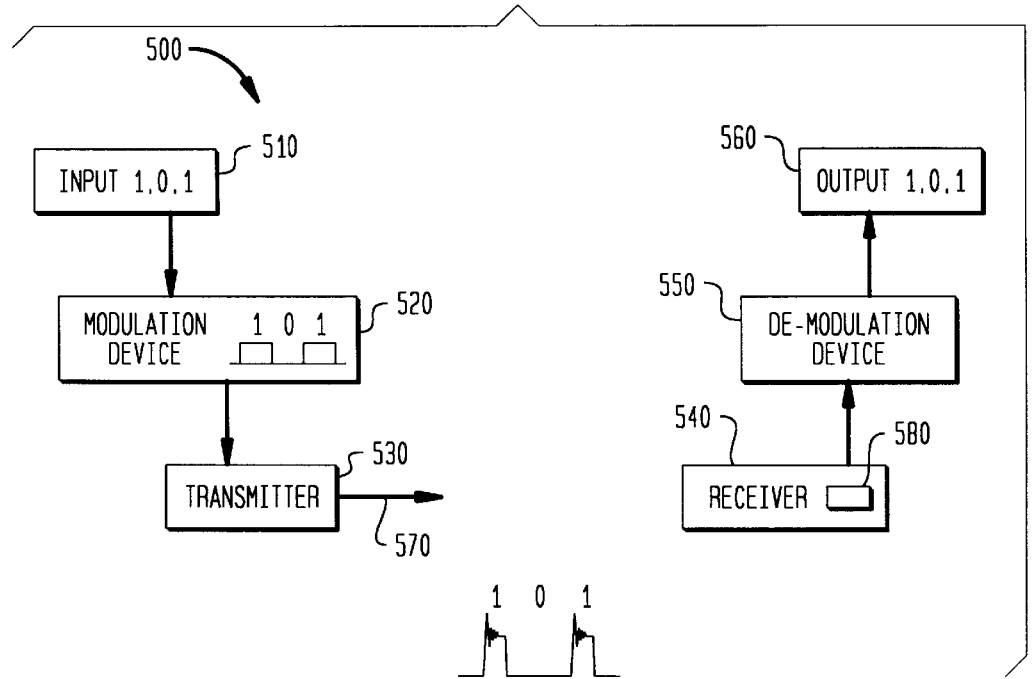
FIG. 5 is a simplified block diagram depicting a wireless optical communication system using a modulation device according to another embodiment of the present invention.

A second illustrative embodiment of an IR wireless optical communication system 500 using relaxation oscillation subcarrier, on-off keying according to the present invention is shown in FIG. 5. Input information or data 510 is combined by an on-off keying modulation device (hereafter modulation device) 520 with a generated optical signal carrier to produce a driving current for a transmitter 530. This modulation of the optical signal carrier with data, inherently, also adds a relaxation oscillation subcarrier to the optical signal, i.e., it adds additional "modulation". Thus, the optical signal transmitted by the transmitter 530 contains both on-off keying data 510 and a relaxation oscillation subcarrier which has the effect of encoding the data 510. This combined signal may be known as a relaxation oscillation subcarrier, on-off keying signal. The transmitter 530 can be any conventional optical transmitting device, for example, a semiconductor laser or a light emitting diode (LED). The transmitter 530 transmits an optical signal 570 incorporating the relaxation oscillation subcarrier that corresponds to the driving current of the modulation device 520. The optical signal 570 thus incorporates the relaxation oscillation of the transmitter 530 to generate the relaxation oscillation subcarrier in the optical signal 570.

A receiver 540 in the IR wireless optical communication system receives the optical signal 570 transmitted by the transmitter 530. The receiver 540 can be any conventional optical receiving device, for example, a photodetector or the like. The receiver 540 preferably includes a narrow bandpass filter 580 centered at the relaxation oscillation frequency or the like. The receiver 540 can be electrically connected to a demodulation device or demodulator 550 for decoding the data encoded by the relaxation oscillation subcarrier on-off keying. The demodulator 550 produces an output 560 corresponding to the input information 510.

By using a relaxation oscillation subcarrier modulation scheme for on-off keying, the IR wireless communication system 500 can transmit a stronger optical signal than an optical communication system using simple binary on-off keying using an equivalent initial power level because the receiver 540 incorporates the narrow bandpass filter 580. Therefore, the optical signal modulated with the relaxation oscillation subcarrier will travel further and result in a lower bit error rate than conventional IR wireless communication systems. Further, relaxation oscillation subcarrier, on-off keying achieves a higher data rate than conventional subcarrier on-off keying.

Because the relaxation oscillation frequency is a function of injection current, the frequency of the relaxation oscillation or oscillations can be controlled by varying the level of the driving current of the transmitter. As a result, relaxation oscillation subcarrier, on-off keying can be used while performing frequency shift keying (FSK) using a group of pulses, each single pulse in the group of pulses having the relaxation oscillation impressed upon it, as shown in FIG. 3B. In FSK, a binary input "1" or "0" is indicated by a shift in frequency of an optical signal.

Figure 4:
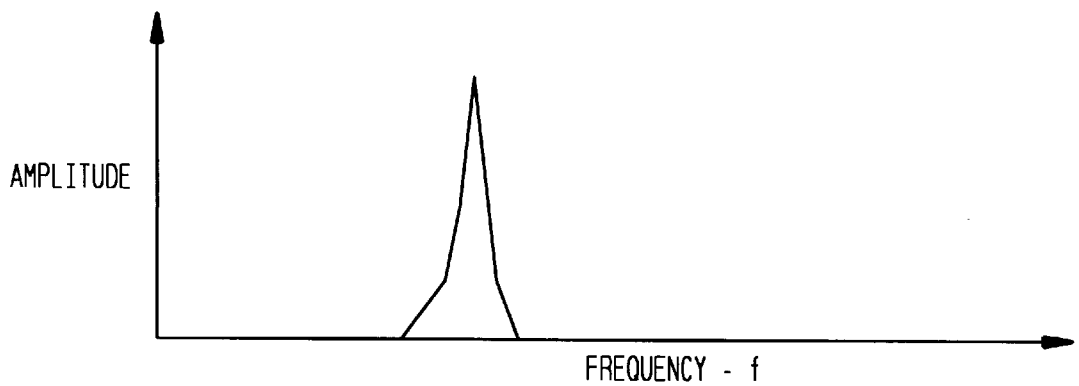
FIG. 4 is a diagram depicting a narrow bandpass filter in the receiver according to an embodiment of the present invention.

In the receiver 540, the narrow bandpass filter 580 having a center frequency of $f$ is used to sense the presence of the relaxation oscillation subcarrier frequency. The width of the filter function is proportional to the constant $\alpha$ as determined in Equation 2. FSK can achieve a higher signal-to-noise ratio because the narrow bandpass filter 580 at the subcarrier frequency is used to detect the presence of subcarrier information at the receiver 540. A plot of amplitude versus frequency for a narrow bandpass filter used to detect an optical signal containing a relaxation oscillation subcarrier with the receiver 540 centered at $f$ is shown in FIG. 4.

Further, because the relaxation oscillation frequency is independent of the duration between consecutive current pulses, relaxation oscillation subcarrier on-off keying can be used while performing multiple frequency shift keying (MFSK). Conventional MFSK permits a plurality of individual optical signals to be combined and transmitted together by a signal combiner or the like.

Figure 1A:
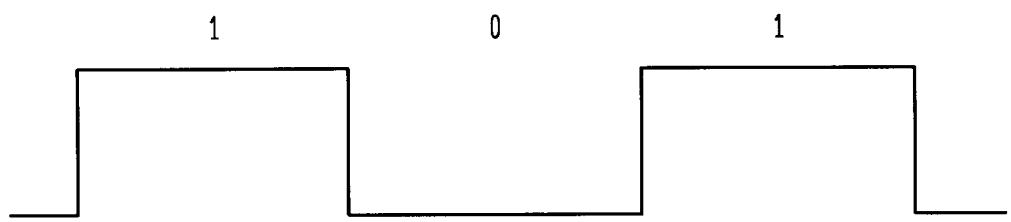
FIGS. 1 and 1B are diagrams depicting conventional binary on-off keying and subcarrier on-off keying, respectively.
Figure 1B:
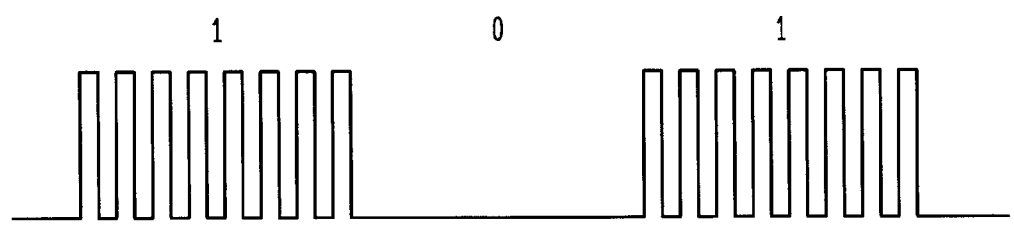

A third illustrative embodiment of an optical communication system transmits a plurality of optical signal sources 710 having different repetition rates of the burst of pulses, as shown in FIG. 3B, to a single receiving circuit 720 having multiple narrow bandpass filters 730 that correspond to the different repetition rates. The optical signals in FIGS. 1A, 1B and 2A are for point-to-point links. The optical signal in FIG. 3B can be used when multiple sources are transmitting to a single receiver.

As shown in FIG. 7, an electrical signal divider 740 receives the output of the receiving circuit 720. The signal divider 740 divides the multiple electrical signals back into individual constituent electrical signals. Electrical signal information is then extracted.

The IR wireless optical communication system 500 in FIG. 5 can be used in either line-of-sight or non-directed wireless communication systems. The optical communication system 500 is one illustrative embodiment of an optical communication system using relaxation oscillation subcarrier, on-off keying. For example, alternative uses for relaxation oscillation subcarrier, on-off keying include: line-of sight controls, infrared datalink association (IRDA) ports used in laptop computers and laser printers, wireless networks or the like.

Figure 6:
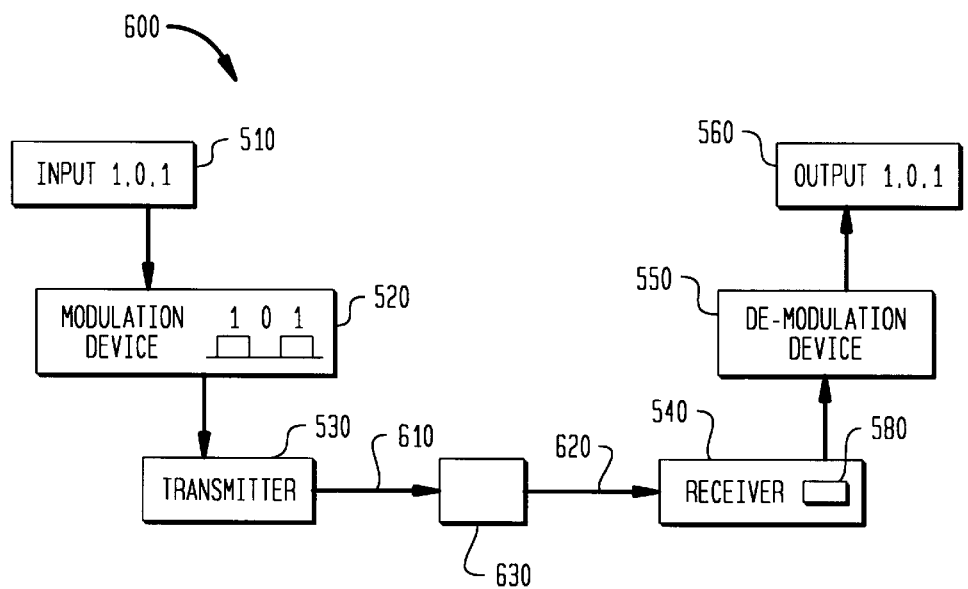
FIG. 6 is a simplified block diagram depicting an optical communication system using a modulation device according to yet another embodiment of the present invention.

A fourth illustrative embodiment of a fiber optic communication system 600 using relaxation oscillation subcarrier, on-off keying according to the present invention is shown in FIG. 6. Upon being transmitted by the transmitter 530, an optical signal 570 is inputted into a first fiber optic link 610. The first fiber optic link or optical fiber 610 can be connected through a fiber optic amplifier 630 to a second fiber optic link 620. The fiber optic links 610, 620 and the optical amplifier 630 can be any well known fiber optic cable and optical amplifier or the like. The second fiber optic link 620 is connected to the receiver 540. Alternatively, the first fiber optic link 610 can be connected directly to the receiver 540. In this case, a first end of the first fiber optic link 610 is where the encoded optical signal is input to the fiber and a second end is where the encoded optical signal is output to the receiver 540.

A conventional fiber optic communication system expends resources in specialized equipment to eliminate relaxation oscillations by biasing a semiconductor laser above a threshold current. Thus, because the fiber optic communication system 600 uses the relaxation oscillation (s), the fiber optic communication system 600 is less expensive to build. By using a relaxation oscillation subcarrier, on-off keying modulation scheme, the fiber optic communication system 600 can transmit a stronger optical signal because the receiver 540 uses the narrow bandpass filter 580 centered at the relaxation oscillation frequency compared to a conventional fiber optic communication system having a wide band filter (Nyquist) at the receiver using an equivalent initial power level. Therefore, an optical signal modulated with the relaxation oscillation subcarrier will travel further, with higher sensitivity, than a optical signal in a conventional fiber optic system. Thus, the fiber optic communication system 600 using relaxation oscillation subcarrier, on-off keying improves efficiency and achieves a lower bit error rate than conventional systems. Further, any specialized equipment used in conventional optical communication systems to remove the relaxation oscillation can be eliminated.

Examples of alternative uses for relaxation oscillation subcarrier, on-off keying for fiber optic communication include: Synchronous Optical Networks (SONET), Fiberoptic Data Distribution Interface (FDDI), 100 Base-F ethernet, and local area networks (LAN) or the like.

According to the present invention, an improved modulation scheme using inherent relaxation oscillation(s) can be applied to all digital optical communications where a laser diode is pulsed.

Because many different embodiments of this invention may be made and used without departing from the invention's spirit and scope, it is understood that the invention is not limited to the specific embodiments discussed above.

What is claimed is:

1. An apparatus for modulating an optical signal used to transmit data between a transmitter and a receiver, comprising:

a modulation device for generating a relaxation oscillation subcarrier, on-off keying signal in the optical signal, the relaxation oscillation subcarrier on-off keying signal encoding data in the optical signal; and a narrow bandpass filter in the receiver for selecting a relaxation oscillation frequency.

2. The apparatus according to claim 1, wherein the modulation device pulses an optical signal driving current between a first level and a second level to generate the relaxation oscillation subcarrier on-off keying signal.

3. The apparatus according to claim 2, wherein the first level is below a threshold current and the second level is above the threshold current of the transmitter.

4. The apparatus according to claim 1, further comprising a demodulation device electrically connected to the receiver for decoding the data encoded by the relaxation oscillation subcarrier on-off keying signal in the optical signal.

5. The modulation system according to claim 1, wherein the transmitter is a semiconductor laser and the receiver is a photodetector.

6. An optical communications system for transmitting optical signals, comprising:

a source generating an optical signal; and a modulator coupled to the source, the modulator encoding data using a relaxation oscillation subcarrier, wherein the modulator generates the relaxation oscillation subcarrier over a plurality of peaks.

7. The optical communication system according to claim 6, further comprising a receiver including a narrow bandpass filter for receiving the optical signal and encoded data at a relaxation oscillation frequency.

8. The optical communication system according to claim 7, further comprising a demodulator electrically connected to the receiver for decoding the encoded data.

9. The optical communication system according to claim 7, further comprising:

an optical fiber interposed between the source of the optical signal and the receiver; and at least one optical amplifier along the optical fiber.

10. The optical communication system according to claim 6, wherein the modulator pulses a source driving current between a first level and a second level to generate the relaxation oscillation subcarrier.

11. The optical communication system according to claim 10, wherein the first level is below a threshold current of the source and the second level is above the threshold current.

12. The optical communication system according to claim 6, wherein said source comprises a plurality of optical signal sources, each of the plurality of optical signal sources generating an optical signal using a relaxation oscillation subcarrier to encode information for transmission, the system further comprising a receiving device including a plurality of narrow bandpass filters that select a plurality of relaxation oscillation frequencies corresponding to the plurality of optical signal sources.

13. A method of operating an optical communications system having a transmitter and a receiver, comprising the steps of:

(1) generating an optical signal carrier in the transmitter;

(2) encoding data using a relaxation oscillation subcarrier, wherein the relaxation oscillation subcarrier is generated over a plurality of peaks; and (3) transmitting the optical signal carrier.

14. The method of claim 13, wherein the encoding step comprises the steps of:

first modulating the optical signal carrier with the data;

generating a relaxation oscillation subcarrier from the first modulation; and second modulating the optical signal carrier to encode the data using the relaxation oscillation subcarrier.

15. The method of claim 13 further comprising the steps of:

centering a narrow bandpass filter in the receiver at a relaxation oscillation frequency; and receiving the encoded optical signal carrier.

16. The method of claim 15, wherein the optical transmitter is an LED and the receiver is a photodetector.

17. The method of claim 13 wherein the optical communication system has an optical fiber communication link interposed between the transmitter and the receiver, further comprising the steps of:

inputting said encoded optical signal carrier into a first end of an optical fiber of the optical fiber communication link; and amplifying said encoded optical signal carrier with an optical amplifier, and wherein said receiving step includes receiving the encoded optical signal carrier centered at a relaxation oscillation frequency at the receiver at a second end of the optical fiber.

* * * * *